United States Patent
Zhao et al.

(10) Patent No.: US 11,150,975 B2
(45) Date of Patent: *Oct. 19, 2021

(54) METHOD AND DEVICE FOR DETERMINING CAUSES OF PERFORMANCE DEGRADATION FOR STORAGE SYSTEMS

(71) Applicant: EMC IP Holding Company LLC, Hopkinton, MA (US)

(72) Inventors: Junping Frank Zhao, Beijing (CN); Yu Cao, Beijing (CN); Sanping Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 137 days.

This patent is subject to a terminal disclaimer.

(21) Appl. No.: 16/531,923

(22) Filed: Aug. 5, 2019

(65) Prior Publication Data
US 2019/0354426 A1 Nov. 21, 2019

Related U.S. Application Data

(63) Continuation of application No. 15/381,596, filed on Dec. 16, 2016, now Pat. No. 10,372,525.

(30) Foreign Application Priority Data

Dec. 23, 2015 (CN) .......................... 201510982223.7

(51) Int. Cl.
*G06F 11/07* (2006.01)
*G06F 11/34* (2006.01)
(Continued)

(52) U.S. Cl.
CPC .......... *G06F 11/079* (2013.01); *G06F 3/0616* (2013.01); *G06F 3/0631* (2013.01);
(Continued)

(58) Field of Classification Search
CPC .... G06F 11/079; G06F 3/0616; G06F 3/0631; G06F 3/0653; G06F 3/0683;
(Continued)

(56) References Cited

U.S. PATENT DOCUMENTS 7,930,583 B1 * 4/2011 Vemuri ................. G06F 11/079
714/4.1
9,418,088 B1 * 8/2016 Noll .................... H04L 67/1097
(Continued)

FOREIGN PATENT DOCUMENTS

| CN | 101176063 A | 5/2008 |
| CN | 104102668 | 10/2014 |
| CN | 104932488 A | 9/2015 |

OTHER PUBLICATIONS

First Office Action issued in counterpart Chinese Patent Application No. 2015109822237 dated Jul. 31, 2019.
(Continued)

*Primary Examiner* — Yolanda L Wilson
(74) *Attorney, Agent, or Firm* — Brian J. Colandreo; Mark H. Whittenberger; Holland & Knight LLP

(57) ABSTRACT

Embodiments of the present disclosure provide a method and apparatus for determining a cause of performance degradation of a storage system. The method comprises: monitoring performance of the storage system according to a predetermined policy; generating a performance degradation event from a result of the monitoring based on system performance baseline; in response to performance degradation event, obtaining information about the performance degradation; and offline analyzing the information to determine the cause of the performance degradation. Compared with the prior art, embodiments of the present disclosure can manage the system performance degradation effectively and
(Continued)

continuously to minimize running costs and enable current performance profiling tools in the manner of insertion.

18 Claims, 10 Drawing Sheets

(51) Int. Cl.
  *G06F 11/30* (2006.01)
  *G06F 3/06* (2006.01)
(52) U.S. Cl.
  CPC .......... *G06F 3/0653* (2013.01); *G06F 3/0689* (2013.01); *G06F 11/0727* (2013.01); *G06F 11/0751* (2013.01); *G06F 11/3034* (2013.01); *G06F 11/3409* (2013.01); *G06F 11/3485* (2013.01); *G06F 11/3495* (2013.01)
(58) Field of Classification Search
  CPC ............. G06F 11/0727; G06F 11/0751; G06F 11/3034; G06F 11/3409; G06F 11/3485
  See application file for complete search history.

(56) References Cited

U.S. PATENT DOCUMENTS

| 10,372,525 | B2 | 8/2019 | Zhao et al. | |
|---|---|---|---|---|
| 2006/0159017 | A1 | 7/2006 | Mun | |
| 2007/0294399 | A1 | 12/2007 | Grossner et al. | |
| 2008/0065928 | A1* | 3/2008 | Suzuki | G06F 11/328 714/3 |
| 2014/0244563 | A1 | 8/2014 | Atomori | |
| 2015/0074450 | A1* | 3/2015 | Blount | G06F 11/0727 714/6.1 |
| 2015/0280969 | A1* | 10/2015 | Gates | G06F 11/30 714/37 |
| 2016/0092292 | A1* | 3/2016 | Lv | G06F 11/3409 714/37 |
| 2016/0191359 | A1* | 6/2016 | Mopur | G06F 11/3041 709/224 |
| 2017/0185466 | A1 | 6/2017 | Zhao et al. | |

OTHER PUBLICATIONS

Non-Final Office issued in related U.S. Appl. No. 15/381,596 dated Sep. 7, 2018.
Notice of Allowance issued in related U.S. Appl. No. 15/381,596 dated Mar. 7, 2019.
Second Office Action issued in related Chinese Patent Application No. 2015109822237 dated Apr. 1, 2020.

* cited by examiner

METHOD AND DEVICE FOR DETERMINING CAUSES OF PERFORMANCE DEGRADATION FOR STORAGE SYSTEMS

RELATED APPLICATIONS

This application is a continuation of U.S. Utility application Ser. No. 15/381,596 filed on Dec. 16, 2016, entitled "METHOD AND DEVICE FOR DETERMINING CAUSES OF PERFORMANCE DEGRADATION FOR STORAGE SYSTEMS" which claims priority from Chinese Patent Application Number CN201510982223.7, filed on Dec. 23, 2015 at the State Intellectual Property Office, China, titled "METHOD AND DEVICE FOR DETERMINING CAUSES OF PERFORMANCE DEGRADATION FOR STORAGE SYSTEMS," the contents of which are herein incorporated by reference in their entirety.

FIELD

Embodiments of the present disclosure generally relate to system performance, and more specifically, to a method and apparatus for determining a cause of performance degradation of a storage system.

BACKGROUND

It is quite tough and time-consuming to position causing performance degradation of a complex system, particularly a production system. Though consistent performance is one of system design goals, almost every system, especially those built with many components, layers or complex logics, suffers unexpected performance degradation in reality, for instance, typically due to the following causes: design and/or implementation defects or limits, software configuration problems and/or hardware limits. Design and/or implementation defects or limits may be about a specific component, i.e., locking or serialization in key I/O path, or more commonly, unexpected interactions between several components, i.e., resource contentions or limited scalability and so on. For example, typical enterprise storage system comprises protocol, cache, data reduction, automatic thin provisioning, snapshot and more and more background services. Any single component and interaction between components may impact user visible performance. Software configuration problem may be, such as block size, cache size or queue size and so on. Hardware limits comprise, for example, specific hardware components (NIC/FC port, CPU or disk) reaching upper limit and becoming a bottleneck of the system, so that the end-end performance of the system cannot continue and so on.

At present, determining a cause of the system degradation is usually a long-duration and postmortem process. The process generally requires manually collecting materials and building an analog environment to represent the problem. As the performance behaviors cannot be captured instantly when performance degrades and lack of orchestration, the above process is usually a manual and repetitively interactive process, thereby causing low-efficiency, uncertain accuracy and high costs.

Therefore, a more accurate and efficient approach is required in the art to solve the above problem.

SUMMARY

Embodiments of the present disclosure aim to provide a method and apparatus for determining a cause of performance degradation of a storage system.

According to a first aspect of the present disclosure, it provides a method for determining a cause of performance degradation of a storage system. The method comprises: monitoring performance of the storage system according to a predetermined policy; generating, based on a system performance baseline, a performance degradation event from a result of the monitoring; in response to the performance degradation event, obtaining information about the performance degradation; and analyze the information offline to determine the cause of the performance degradation.

In some embodiments, monitoring the performance of the storage system according to the predetermined policy comprises: based on a predetermined monitoring target, tracking monitoring a performance metric of the predetermined monitoring target to obtain original performance data of the predetermined monitoring target; and generating a performance degradation event from a result of the monitoring based on a system performance baseline comprises: comparing the original performance data with a latest system performance baseline; and generating the performance degradation event based on a result of the comparing.

In some embodiments, generating the performance degradation event based on a result of the comparing comprises: generating the performance degradation event in response to the original performance data is lower than the latest system performance baseline.

In some embodiments, the method further comprises: recording the performance degradation event as a four-element tuple. The four-element tuple includes: a latest performance statistic, an indicator of the performance degradation, a degree of the performance degradation, and a count for reaching the degree of the performance degradation.

In some embodiments, the method further comprises: detecting normal performance of the storage system to generate a detected system performance baseline; and generate the latest system performance baseline based on the detected system performance baseline.

In some embodiments, detecting normal performance of a storage system comprises: detecting the normal performance of the storage system periodically; or detecting the normal performance of the storage system in response to a configuration change of the storage system, where the configuration change includes at least one of the following: hardware change, work load change, booting up of the storage system and mounting of a file system.

In some embodiments, generating the latest system performance baseline based on the detected system performance baseline comprises: generating the latest system performance baseline by weighting a current system performance baseline and the detected system performance baseline.

In some embodiments, obtaining information about the performance degradation in response to the performance degradation event comprises: performing a first action based on a degree of performance degradation, where the first action comprises at least one of the following: analyzing, on a first target, a first layer; analyzing, on the first target, a plurality of layers in vertical; and analyzing, on the first layer, a plurality of targets in horizontal.

In some embodiments, obtaining information about the performance degradation in response to the performance degradation event further comprises: monitoring resource utilization of the storage system; and performing a second action based on the resource utilization; and performing the first action to obtain the information about the performance degradation, where the second action comprises at least one of the following: ranking, based on the resource utilization, a plurality of targets that utilize a specific resource; and limiting the utilization of the specific resource by at least one of the plurality of targets with a rank higher than a predetermined threshold.

In some embodiments, the first action is performed by at least one of the following entities: a system built-in performance profiling tool, an plug-in performance profiling tool, and a third-party performance profiling tool.

In some embodiments, information about the performance degradation comprises at least one of the following: related event information, system tracking information, latest performance statistics information, and relevant system configuration information.

According to a second aspect of the present disclosure, it provides an apparatus for determining a cause of performance degradation of a storage system, comprising: a performance monitoring module configured to monitor performance of the storage system according to a predetermined policy; a degradation detecting module configured to generate, based on a system performance baseline, a performance degradation event from a result of the monitoring; a performance profiling module configured to obtain information about the performance degradation in response to the performance degradation event; and a cause determining module configured to analyze the information offline to determine a cause of performance degradation.

In some embodiments, the performance monitoring module is configured to: based on a predetermined monitoring target, tracking a performance metric of the monitoring target to obtain original performance data of the monitoring target; and the degradation detecting module is configured to: compare the original performance data with a latest system performance baseline; and generate performance degradation event based on a result of the comparing.

In some embodiments, generating performance degradation event based on a result of the comparing comprises: generating the performance degradation event in response to the original performance data is lower than the latest system performance baseline.

In some embodiments, the apparatus further comprises: an event recording module configured to record performance degradation event as a four-element tuple, where the four-element tuple includes: a latest performance statistic, an indicator of the performance degradation, a degree of the performance degradation, and a count for reaching the degree of the performance degradation.

In some embodiments, the apparatus further comprises: a baseline detecting module configured to detect normal performance of the storage system to generate a detected system performance baseline, and a baseline generating module configured to generate the latest system performance baseline based on the detected system performance baseline.

In some embodiments, the baseline detecting module is configured to: detect the normal performance of the storage system periodically; or detect the normal performance of the storage system in response to configuration change of the storage system, where the configuration change comprises at least one of the following: hardware change, work load change, booting up of the storage system and mounting of a file system.

In some embodiments, the baseline generating module is configured to: generate the latest system performance baseline by weighting a current system performance baseline and the detected system performance baseline.

In some embodiments, the performance profiling module is configured to: perform a first action based on a degree of performance degradation, where the first action comprises at least one of the following: analyzing, on a first target, a first layer; analyzing, on the first target, a plurality of layers in vertical; and analyzing, on the first layer, a plurality of targets in horizontal.

In some embodiments, the performance profiling module is further configured to: monitor resource utilization of the storage system; perform a second action based on the resource utilization; and perform the first action to obtain information about the performance degradation, where the second action comprises at least one of the following: ranking, based on the resource utilization, a plurality of targets that utilize a specific resource; and limiting the utilization of the specific resource by at least one of the plurality of targets with a rank higher than a predetermined threshold.

In some embodiments, the first action is implemented by at least one the following entities: a system built-in performance profiling tool, a plug-in performance profiling tool, and a third-party performance profiling tool.

In some embodiments, information related to the performance degradation comprises at least one of the following: related event information, system tracking information, latest performance statistics information, and relevant system configuration information.

According to a third aspect of the present disclosure, it provides a computer program product for determining causing cause of performance degradation of a storage system. The computer program product is tangibly stored in a non-transitory computer readable medium and comprises computer-implementable instructions which, when being executed, cause the computer to implement any steps of the method.

Compared with the prior art, the method and apparatus for determining performance degradation of the storage system according to embodiments of the present disclosure can manage system performance degradation effectively and continuously to minimize running costs and enable the current performance profiling tools in the manner of insertion.

BRIEF DESCRIPTION OF THE DRAWINGS

Figures are illustrated herein to provide further understanding and constitute a part of the present disclosure. Exemplary embodiments of the present disclosure will be illustrated by way of example and do not form limitation to the present disclosure. In the drawings.

In all accompanying figures, the same or corresponding reference sign represents the same or corresponding part.

DETAILED DESCRIPTION OF EMBODIMENTS

Various example embodiments of the present disclosure will be described in detail with reference to the accompanying drawings in the following text. It should be noted that these drawings and descriptions are only exemplary embodiments. It should be pointed out that alternative embodiments of the structure and method of the present disclosure can be easily envisaged according to the following description and be employed without departing from the principles protected by the present disclosure.

It should be understood that these exemplary embodiments are only provided to enable those skilled in the art to better understand and then further implement embodiments of the present disclosure and do not intend to limit the scope of the present invention in any manner.

The terms "include," "comprise" and similar terms as used herein should be understood as open terms, that is, "include/comprise, but do not limit to". The term "based on" refers to "based at least partially on". The term "one embodiment" refers to "at least one embodiment"; the term "another embodiment" or "a further embodiment" indicates "at least one further embodiment." Relevant definitions of other terms will be provided in the depiction below.

Figure 1:
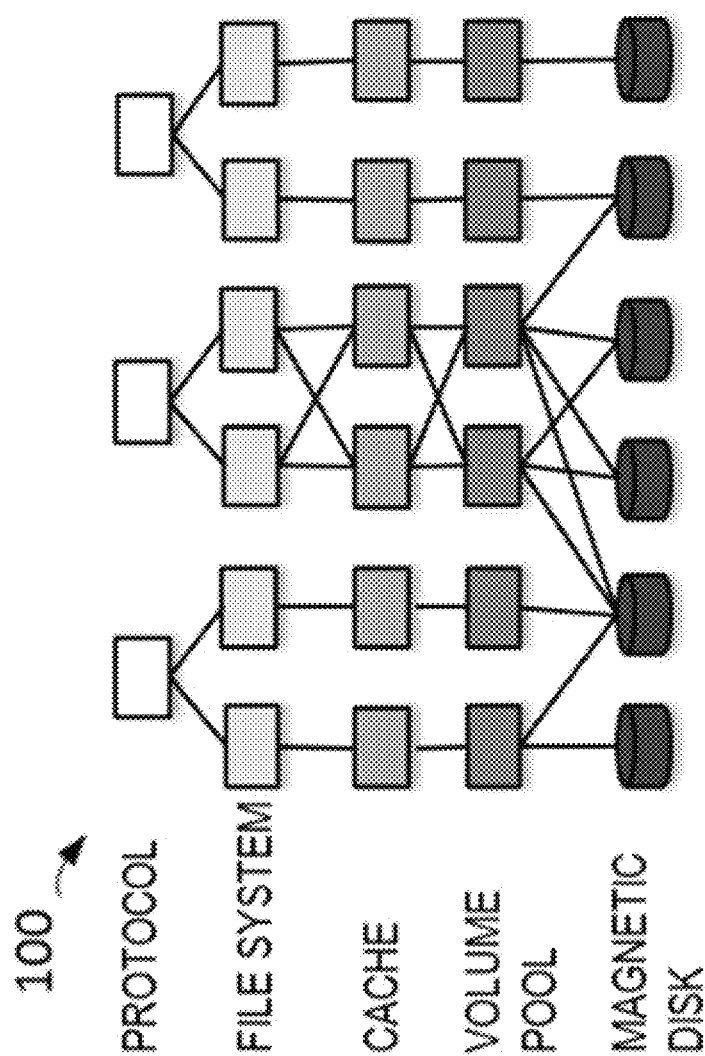
FIG. 1 illustrates a schematic diagram of an exemplary storage system 100 according to embodiments of the present disclosure.
Figure 2:
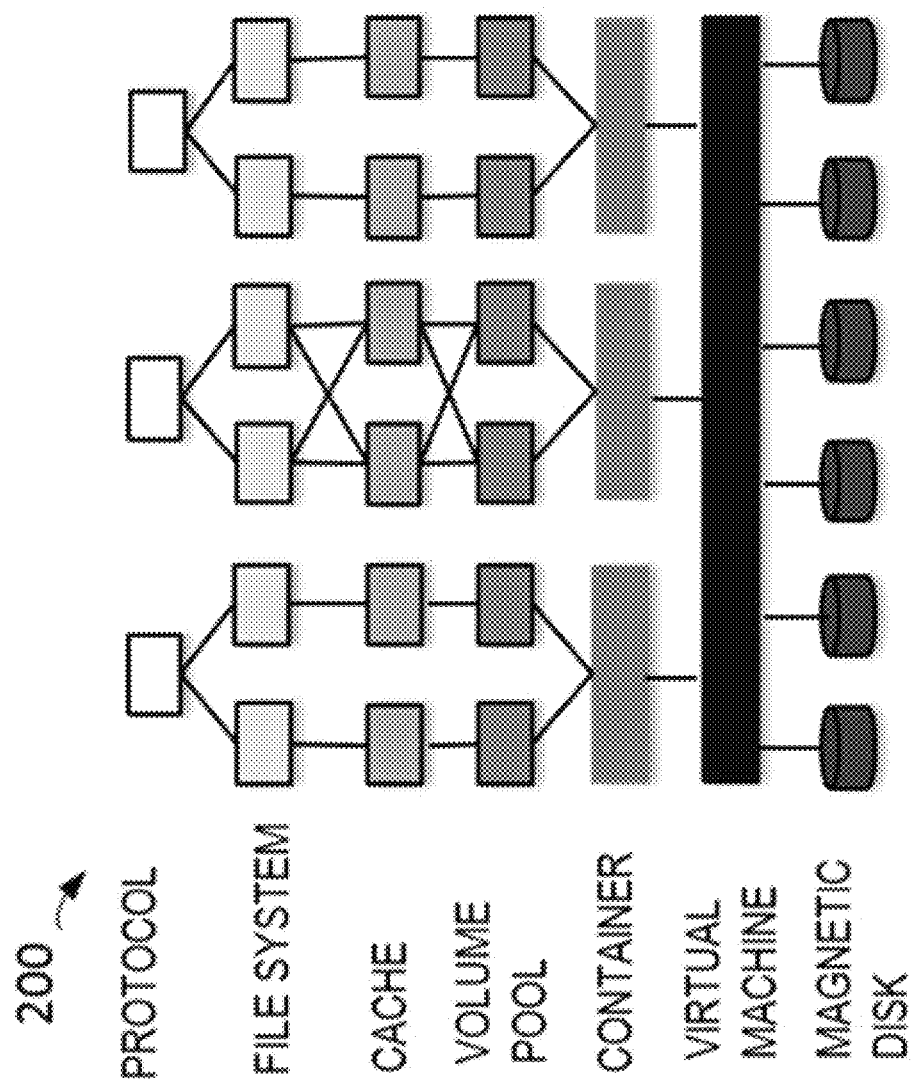
FIG. 2 illustrates a schematic diagram of an exemplary storage system 200 according to embodiments of the present disclosure.

FIG. 1 and FIG. 2 illustrate two example storage systems for implementing embodiments of the present disclosure, respectively. FIG. 1 illustrates an example storage system 100 operating in a physical environment. As shown in FIG. 1, the storage system 100 includes a protocol layer (for example Ethernet protocol, Internet Small Computer System Interface (iSCSI), optical fiber channel protocol, InfiniBand (IB) and so on), a file system layer, a cache layer, a volume pool layer and magnetic disks in the underlying layer. It should be understood that the storage system shown in FIG. 1 is only for the purpose of simplified explanation, rather than limiting the environment that can implement embodiments of the present disclosure. In practice, embodiments of the present disclosure can also be implemented in the storage system with structure of other layers. It should also be understood that the number of targets shown in each layer in FIG. 1 is only exemplary, rather than the number of real targets in an actual storage system. FIG. 2 illustrates another exemplary storage system 200 operating in a virtual (container) environment. Different from the storage system 100 shown in FIG. 1, the storage system 200 includes a container layer which can be built on a virtual machine layer. Moreover, the storage system 200 also includes a plurality of layers, such as a protocol layer, a file system layer, a cache layer, and a volume pool layer and the like and can provide a plurality of data services, such as data dedup, compression, automatic thin provisioning, snapshot and more and more background services, such as re-balance, defrag, integrity verification, failure rebuilding and so on. In the storage system shown in FIG. 1 and the storage system 200 shown in FIG. 2, any single component or interaction between components may impact user visible performance. Apart from the defects or limits of the system configuration per se and/or implementation, it can also cause degradation of user visible performance that software configuration, such as block size, cache size or queue size and so on and hardware limit, such as a specific hardware component (NIC/FC port, CPU or disk) reach upper limit and become the bottleneck of system.

Figure 3:
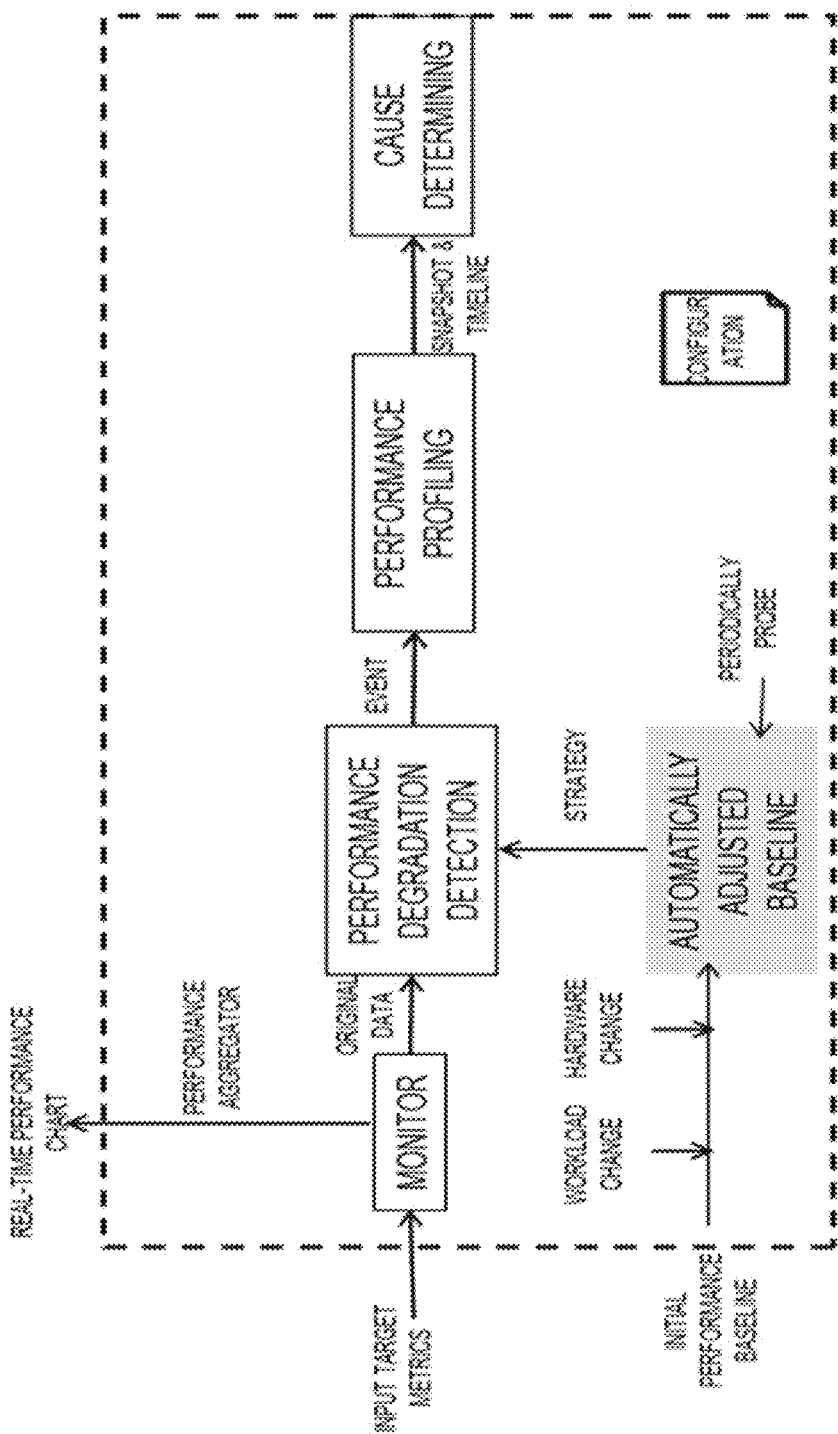
FIG. 3 illustrates a system block diagram for determining a cause of system performance degradation according to embodiments of the present disclosure.

To solve the above problem, embodiments of the present disclosure provide a solution to determining a cause of performance degradation of a storage system. For instance, FIG. 3 illustrates a system block diagram for determining a cause of system performance degradation according to embodiments of the present disclosure. According to embodiments of the present disclosure as shown in FIG. 3, the process of determining performance degradation of the storage system can be divided into four stages: monitoring, detecting performance degradation, performance profiling and determining a cause of the performance degradation.

During the monitoring stage, specific (for example, specified by a user or by system default) target and performance metrics can be monitored, where the target can be one or more specific file systems, volumes, virtual machines and/or containers shown in FIG. 1 and/or FIG. 2. For example, the monitored performance metrics can also be specified by the user and may include, for instance, Input/Output Operations Per Second (IOPS), latency, bandwidth, read or write request, or arbitrary combinations of the aforementioned, such as a write latency on volume 1. The output at the monitoring stage can be original performance data or a real-time performance chart generated by a performance aggregator. According to embodiments of the present disclosure, a module for implementing performance monitoring (for example, comprising a performance aggregator) can be a lightweight software module operating continuously in the memory which keeps tracking performance metrics of the target specified by the user to detect any early-stage performance degradation.

During the stage of detecting performance degradation, a performance degradation event can be generated for the original performance data output in the monitoring phase based on system performance baseline.

The system performance baseline can be used to indicate normal system performance of a specific metric. It should be noted that system performance baseline does not denote service quality but only represent a standard of performance stability to distinguish normal performance and abnormal performance properly. For example, the initial system performance baseline can be specified by the user. Furthermore, system performance baseline may be changed dynamically due to the following reasons: increase or decrease (including failure) of hardware resources (such as Central Processing Unit (CPU), memory, magnetic disks or network cards), workload changes (for example, more or less client terminals, threads, requests, and changes of read/write ratio, I/O size or I/O pattern) and limits of system design or implementation and so on.

Figure 4:
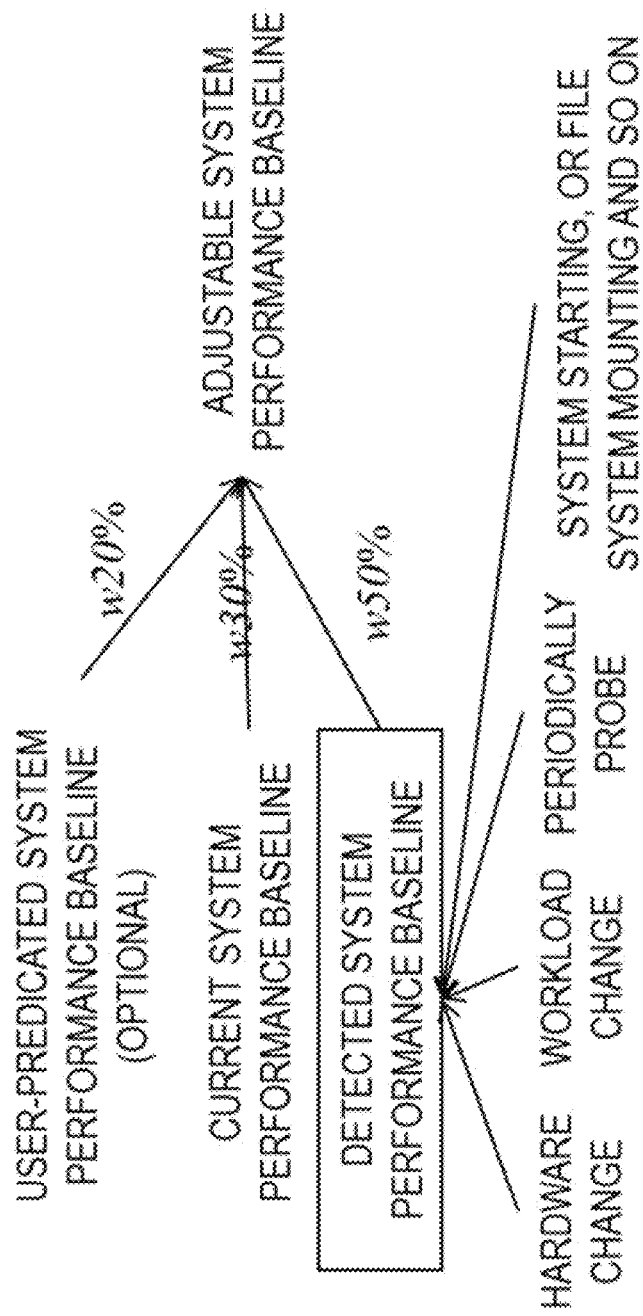
FIG. 4 illustrates a schematic diagram of a latest system performance baseline generated by way of weighting according to embodiments of the present disclosure.

As the system performance baseline can change due to different reasons, to generate a performance degradation event with an accurate system performance baseline, the system performance baseline can be adjusted dynamically. For instance, the system performance baseline can be adjusted dynamically in the following manner: firstly, normal performance of the storage system can be detected when the storage system is idle to generate a detected system performance baseline; the normal performance of the storage system can be detected periodically, for instance, according to a period configured by the user (for example, every two hours); or in response to configuration change of the storage system, the normal performance of the storage system is detected. For instance, the configuration change of the storage system can include: hardware change, such as increasing or decreasing the memory, magnetic disk or network card and so on; workload change, such as read requests in the latest 5 seconds increasing by 50% than in the past 30 seconds or I/O size changes; booting up of the storage system and mounting of the file system. The latest system performance baseline can be generated based on a current system performance baseline and detected system performance baseline. For instance, FIG. 4 illustrates a schematic diagram of a latest system performance baseline generated by way of weighting according to embodiments of the present disclosure. As shown in FIG. 4, the detected system performance baseline, the current system performance baseline and the optional system performance baseline predicted by the user can be combined in the manner of weighting to generate the latest system baseline. In FIG. 4, for example, the detected system performance baseline is assigned with 50% weight, the current system performance baseline is assigned with 30% weight and the system performance baseline predicted by the user is assigned with 20% weight. FIG. 4 only illustrates one manner of generating the latest system performance baseline. However, it should be understood that according to embodiments of the present disclosure, the latest system performance baseline can be generated in other manners, including but not limited to the manner of weighting and the object of weighting is optional.

Figure 5:
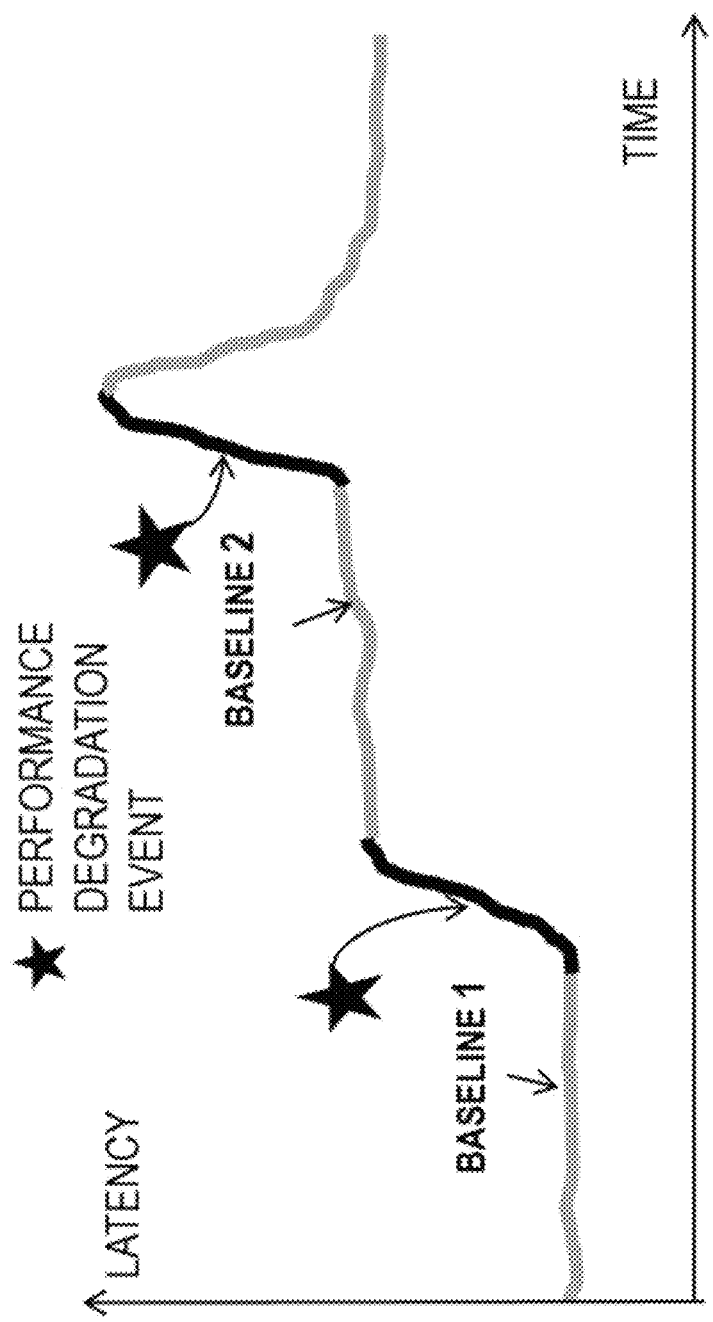
FIG. 5 illustrates a schematic diagram of an adjustable system performance baseline and system performance degradation event according to embodiments of the present disclosure.

Now returning to FIG. 3, as shown in FIG. 3, a performance degradation event can be generated according to a policy specified by the user. For instance, when a current system performance represented by the original performance data is lower than a latest system performance baseline, a performance degradation event can be generated. In this respect, FIG. 5 illustrates a schematic diagram of an adjustable system performance baseline and system performance degradation event according to embodiments of the present disclosure. As shown in FIG. 5, the horizontal coordinate axis represents time and vertical coordinate axis represents a performance metric (for example, latency). FIG. 5 illustrates two system performance baselines: baseline 1 and baseline 2, and the performance degradation event is indicated with a star-shaped marker. According to embodiments of the present disclosure, a performance degradation event can be marked with a four-element tuple, where the four-element tuple includes: a latest performance statistic, for instance, aggregated performance statistics for most recent 3-5 seconds; an indicator of performance degradation, such as degradation or no degradation; a degree of the performance degradation, such as the percentage of degradation over the latest system performance baseline; and a count for reaching the degree of the performance degradation, for instance, within 30 seconds or twice and so on. Therefore, a complete performance degradation event can be described, for example, as: two times of write latency within most recent three seconds get 20% worse than the latest system performance baseline.

Now returning to FIG. 3, at the stage of performance profiling, information about the performance degradation is obtained in response to the performance degradation event. According to embodiments of the present disclosure, performance profiling can be performed in different manners for different types of storage systems.

Figure 6:
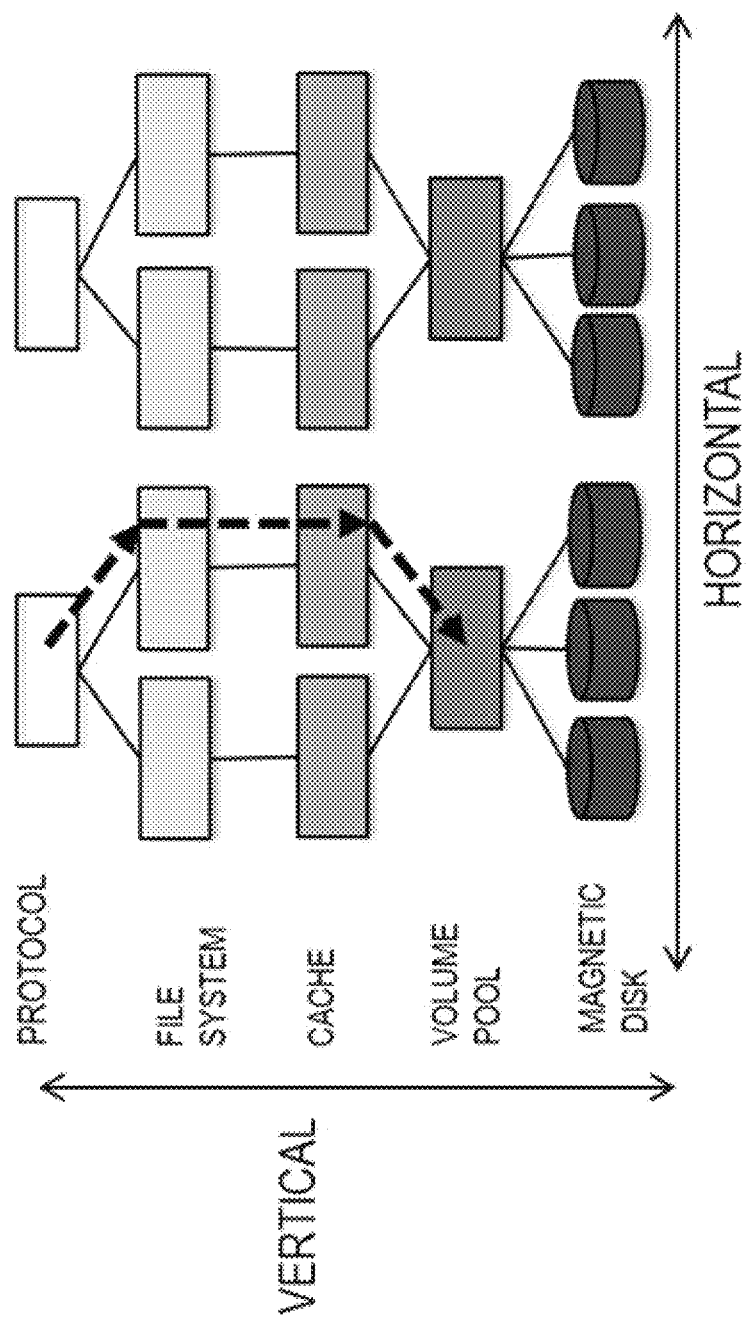
FIG. 6 illustrates a schematic diagram for top-down performance profiling in a physical environment according to embodiments of the present disclosure.

For the storage system 100 operating in a physical environment shown in FIG. 1, for example, performance profiling can be performed in a top-down application-specific manner. FIG. 6 illustrates a schematic diagram for top-down performance profiling in a physical environment according to embodiments of the present disclosure. The approach for performance profiling illustrated in FIG. 6 includes two types: vertical analyzing and horizontal analyzing. Vertical analyzing means tracking all the layers in the vertical direction for a specific target (as shown by the dotted arrow in FIG. 6); horizontal analyzing means tracking all the targets (or objects) in a specific layer regardless of the target on upper layers or lower layers. According to embodiments of the present disclosure, vertical analyzing can be performed firstly for quick sorting and ranking, then the range of bottleneck for the system with higher rank is narrowed down to at least one specific layer, and then horizontal analyzing is implemented at a certain layer to obtain more detail information. According to embodiments of the present disclosure, in response to the performance degradation event, an action of performance profiling can be performed based on the degree of performance degradation. According to embodiments of the present disclosure, the action in Table 1 can be implemented with at least one of the following entities: a system built-in performance profiling tool (for example, JTrace for VNX product of EMC™), a plug-in performance profiling tool, and a third-party performance profiling tool (for example, VTune™ performance profiling device from Intel™).

TABLE 1

| level | deviation (%) | Period/Times | Performance Profiling Action |
|---|---|---|---|
| #1 | 20% | 3 | Profiling cache-layer only on a specific target, lasting 5 seconds |
| #2 | 50% | 2 | Vertical profiling the cache-layer, the file system layer and the volume pool layer on a specific target, lasting 10 seconds |
| #3 | 100% | 2 | Profiling system wide, lasting 15 seconds |
| #4 | 200% | 1 | Profiling system wide, and calling 3$^{rd}$ party profiling tools |
| ... | ... | ... | ... |

Figure 7:
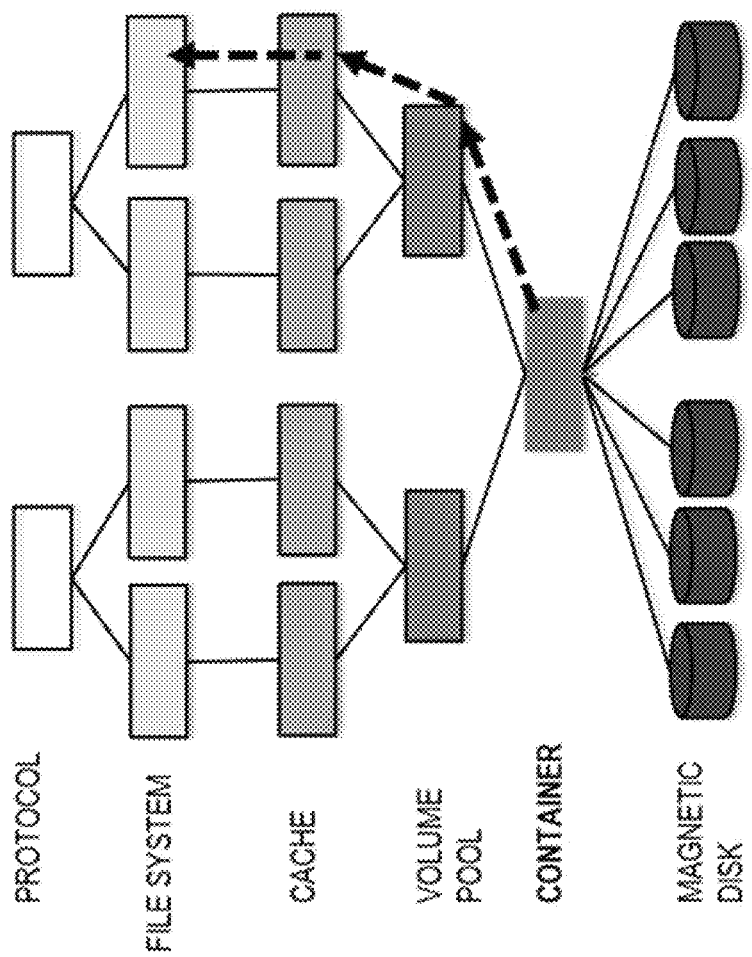
FIG. 7 illustrates a schematic diagram for down-top performance profiling in a virtual (container) environment according to embodiments of the present disclosure.

For the storage system 200 operating in a virtual (container) environment shown in FIG. 2, as its resources are shared among multiple applications/file systems/storage volumes, extra system software (container and hypervisor) might thus be required and new bottleneck would be caused before system performance degrades. Therefore, it is reasonable to monitor underlying layers of the storage system closely when a performance degradation event is detected. For instance, a down-top approach can be used for performance profiling for such a system. FIG. 7 illustrates a schematic diagram for down-top performance profiling in a virtual (container) environment according to embodiments of the present disclosure. The performance profiling method as shown by the arrow in FIG. 7 may include the following steps: monitoring resource utilization (for example, memory, CPU, magnetic disk or network) of the storage system (container) and performing corresponding actions based on the resource utilization. For instance, actions are performed respectively with regard to CPU utilization exceeding 75% of its quota for 5 seconds uninterruptedly, memory utilization exceeding 80% of its quota for 10 seconds uninterruptedly and I/O exceeding 90% of its quota for 30 seconds uninterruptedly. According to embodiments of the present disclosure, a target utilizing a specific resource (for example, volume pool 2) can be ranked according to the above resource utilization, thereby narrowing range of causing performance degradation; then utilization of specific resources by specific targets with a rank higher than a predetermined threshold can be limited (for example, I/O utilization of volume pool 2 is limited in the manner of queuing and configuring lower priority) to reduce influence to other targets; moreover, the performance profiling action as shown in Table 1 can also be implemented based on the degree of performance degradation to obtain information related to the performance degradation.

As stated above, according to embodiments of the present disclosure, for the physical environment without any virtualization or container, an application-specific top-down performance profiling approach can be employed; while in a virtualized/container environment, a down-top performance profiling approach can be adopted, or in response to firstly meeting the degree of performance degradation (for example, the predetermined resource utilization is not met yet), the application-specific top-down performance profiling approach is employed, or any of the two approaches is employed at different periods.

Now returning to FIG. 3, as shown in FIG. 3, detailed information related to the performance degradation is output at the stage of the performance profiling, for instance, the information may include related event information (for example, files in lightweight data exchange format based on JavaScript language), system tracking information (tracking file generated by VTune™ performance profiling device), latest performance statistics information and relevant system configuration information and so on. The information can be employed as a snapshot of storage system performance representation and a plurality of performance snapshots are sorted chronologically to form a timeline of the storage system performance.

Then, the system performance snapshots gathered above can be uploaded to an individual storage bank (for example, an individual host, support center or cloud) and offline analyzing of the configuration can be performed automatically or manually to determine the cause of the performance degradation.

Figure 8:
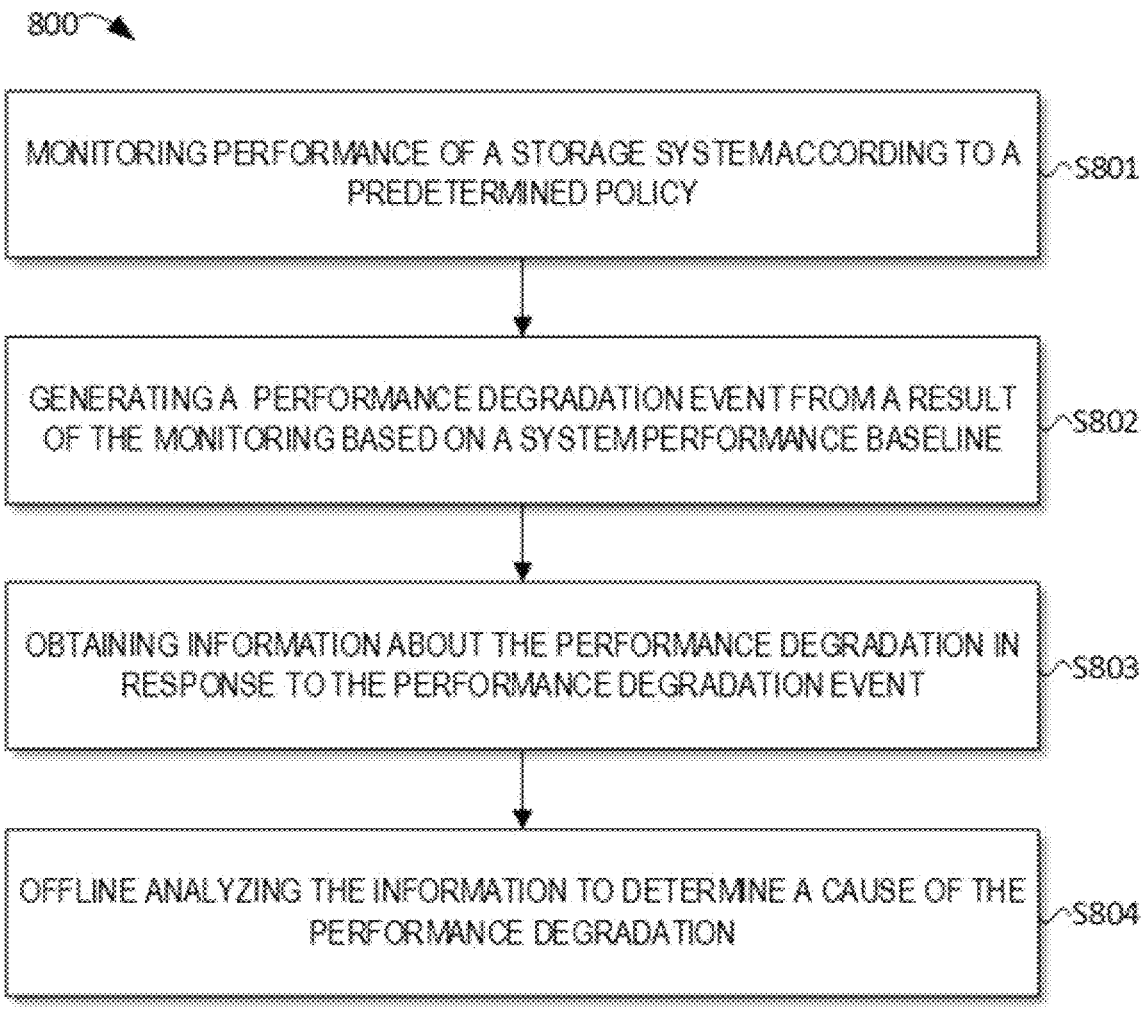
FIG. 8 illustrates a flow chart of method 800 for determining a cause of performance degradation of a storage system according to embodiments of the present disclosure.

FIG. 8 illustrates a flow chart of method 800 for determining a cause of performance degradation of a storage system according to embodiments of the present disclosure.

At S801, the performance of the storage system is monitored according to a predetermined policy.

According to embodiments of the present disclosure, at S801, the method 800 may include monitoring the performance metrics of a monitoring target to obtain original performance data of the predetermined monitoring target based on the predetermined monitoring target.

Then, the method 800 proceeds to S802, where corresponding performance degradation event is generated based on a system performance baseline for the monitored result.

According to embodiments of the present disclosure, at S802, the method 800 may include comparing the original performance data with a latest system performance baseline; and generating a performance degradation event based on a result of the comparing.

According to embodiments of the present disclosure, a normal performance of the storage system can be detected to generate a detected system performance baseline; and a latest system performance baseline can be generated based on the detected system performance baseline, where detecting the normal performance of the storage system includes: detecting the normal performance of the storage system periodically; or detecting the normal performance of the storage system in response to a configuration change of the storage system, where the configuration change includes at least one of the following: hardware change, work load change, booting up of the storage system and mounting of the file system.

According to embodiments of the present disclosure, generating a latest system performance baseline based on the detected system performance baseline includes: generating the latest system performance baseline by weighting a current system performance baseline and the detected system performance baseline, where generating the performance degradation event based on a result of the comparing may include generating a performance degradation event in response to the original performance data is lower than the latest system performance baseline.

According to embodiments of the present disclosure, a performance degradation event can be recorded as a four-element tuple, where the four-element tuple includes: a latest performance statistic, an indicator of the performance degradation, degree of performance degradation and a count for reaching the degree of the performance degradation.

Then, the method 800 proceeds to S803 where information related to the performance degradation can be obtained in response to the performance degradation event.

According to embodiments of the present disclosure, at S803, the method 800 may include performing a first action based on the degree of performance degradation, where the first action includes at least one of the following: analyzing a specific layer and specific target; vertically analyzing multiple layers for a specific target; and horizontally analyzing multiple targets for a specific layer. Furthermore, the first action can be implemented by at least one of the following entities: a system built-in performance profiling tool, a plug-in performance profiling tool, and a third-party performance profiling tool.

According to embodiments of the present disclosure, at S803, the method 800 may further include monitoring resource utilization of the storage system; based on the resource utilization, performing a second action; and performing the first action to obtain information related to the performance degradation, where the second action includes at least one of the following: based on the resource utilization, ranking targets utilizing a specific resource; and limiting the utilization of specific resources by specific targets with a rank higher than a predetermined threshold.

According to embodiments of the present disclosure, information related to the performance degradation includes at least one of the following: related event information, system tracking information, latest performance statistics information, and relevant system configuration information.

Then, the method 800 proceeds to S804 where the information is offline profiled to determine a cause of performance degradation.

In some embodiments, the method 800 terminates after S804.

For clarity, some optional actions of the method 800 are not shown in FIG. 8. However, it should be understood that all the features depicted in FIGS. 3-7 equally apply to the method 800.

Particularly, according to embodiments of the present disclosure, the method 800 depicted with reference to FIG. 8 can be implemented as a computer software program. For example, embodiments of the present disclosure include a computer program product which is tangible stored in a non-transitory computer readable medium and includes computer-implementable instructions which, when being executed, cause the computer to implement any steps of the method 800.

Figure 9:
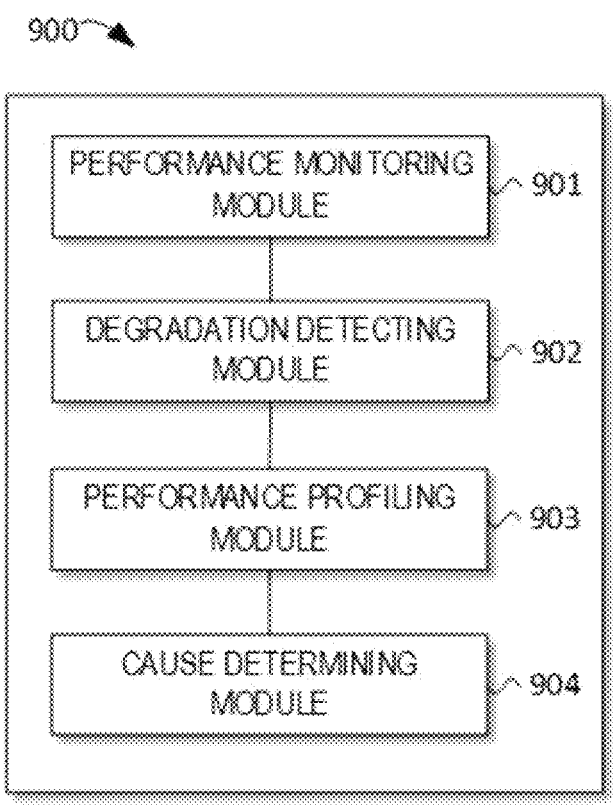
FIG. 9 illustrates a block diagram of apparatus 900 for determining a cause of performance degradation of a storage system according to embodiments of the present disclosure.

FIG. 9 illustrates a block diagram of apparatus 900 for determining a cause of performance degradation of a storage system according to embodiments of the present disclosure. The apparatus 900 may include: a performance monitoring module 901 configured to monitor performance of the storage system according to a predetermined policy; a degradation detecting module 902 configured to generate a performance degradation event based on a system performance baseline from a result of the monitoring; a performance profiling module 903 configured to obtain information about the performance degradation in response to the performance degradation event; and a cause determining module 904 configured to analyze the information offline to determine a cause of the performance degradation.

According to embodiments of the present disclosure, the performance monitoring module 901 is configured to monitor performance metrics of a monitoring target based on a predetermined monitoring target to obtain original performance data of the monitoring target; and the degradation detecting module is configured to compare the original performance data with a latest system performance baseline; and generate performance degradation event based on a result of the comparing, where generating the performance degradation event based on a result of the comparing includes generating a performance degradation event in response to the original performance data is lower than the latest system performance baseline.

According to embodiments of the present disclosure, the apparatus 900 further includes an event-recording module configured to record the performance degradation event as a four-element tuple, where the four-element tuple includes: a latest performance statistic, an indicator of performance degradation, a degree of performance degradation, and a count for reaching the degree of the performance degradation.

According to embodiments of the present disclosure, the apparatus 900 further includes a baseline detecting module configured to detect a normal performance of the storage system to generate a detected system performance baseline. The baseline detecting module is configured to detect the normal performance of the storage system periodically; or detect the normal performance of the storage system in response to a configuration change of the storage system, where the configuration change includes at least one of the following: hardware change, work load change, booting up of the storage system and mounting of a file system.

According to embodiments of the present disclosure, the apparatus 900 further includes a baseline generating module configured to generate a latest system performance baseline based on the detected system performance baseline. The baseline generating module is configured to generate the latest system performance baseline by weighting a current system performance baseline and the detected system performance baseline.

According to embodiments of the present disclosure, the performance profiling apparatus is configured to perform a first action based on the degree of performance degradation, where the first action includes at least one of the following: analyzing a specific layer and specific target; vertically analyzing multiple layers for a specific target; and horizontally analyzing multiple targets for a specific layer. Furthermore, the first action can be implemented by at least one the following entities: a system built-in performance profiling tool, a plug-in performance profiling tool, and a third-party performance profiling tool.

According to embodiments of the present disclosure, the performance profiling apparatus is further configured to monitor resource utilization of the storage system; perform a second action based on the resource utilization; and perform the first action to obtain information related to performance degradation, where the second action includes at least one of the following: ranking targets utilizing specific corresponding resources based on the resource utilization; and limiting the utilization of specific resources by specific targets with a rank higher than a predetermined threshold.

According to embodiments of the present disclosure, information related to performance degradation includes at least one of the following: related event information, system tracking information, latest performance statistics information, and relevant system configuration information.

For clarity, some optional actions of the apparatus 900 are not shown in FIG. 9. However, it should be understood that all the features depicted in the method of the present disclosure equally apply to the apparatus 900. Furthermore, all devices of the apparatus 900 can be a hardware module or a software module. For example, in some embodiments, the apparatus 900 can be partially or wholly implemented with software and/or firmware, for instance, implemented as a computer program product contained in a computer readable medium. Optionally or additionally, apparatus 900 can be partially or wholly implemented based on hardware, such as integrated circuit (IC), application specific integrated circuit (ASIC), a system on chip (SOC), or field programmable gate array (FPGA) and so on. The scope of the present disclosure is not limited in this aspect.

Figure 10:
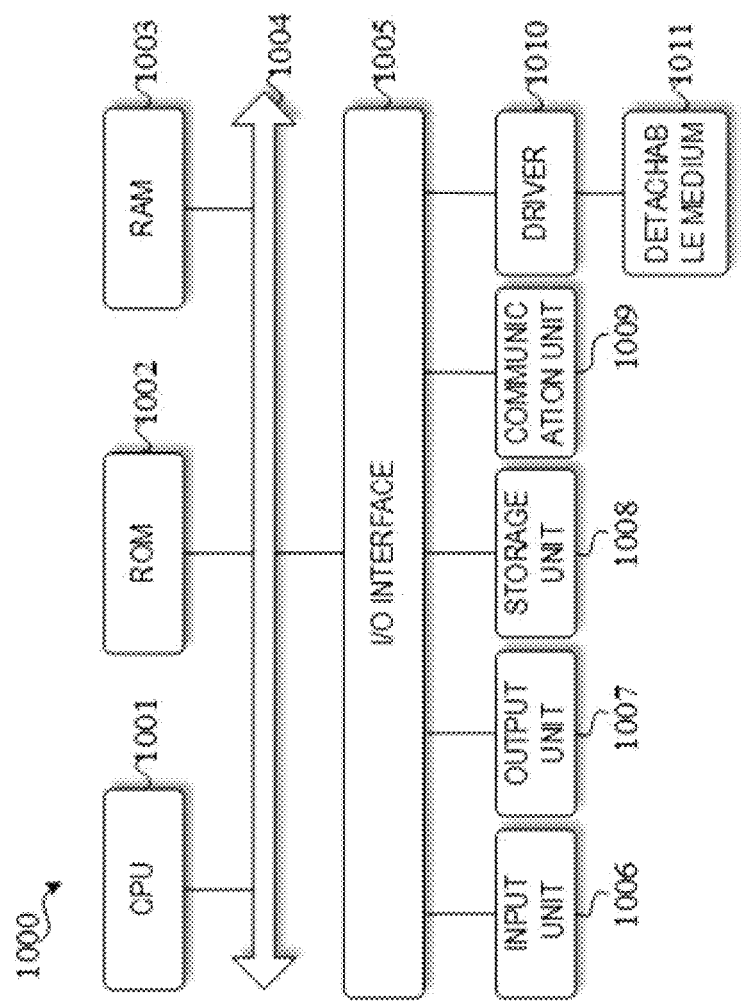
FIG. 10 illustrates a block diagram of computer system 1000 adapted to implement embodiments of the present disclosure.

Now reference is made to FIG. 10. FIG. 10 illustrates a block diagram of a computer system 1000 adapted to implement embodiments of the present disclosure. For instance, the method 800 illustrated in FIG. 8 can be implemented on a computer system 1000. As shown in FIG. 10, the computer system 1000 includes a central processing unit (CPU) 1001 which can perform various proper actions and processing based on a program stored in a read only memory (ROM) 1002 or a program uploaded from a storage part 908 to a random access memory (RAM) 1003. In RAM 1003, it further stores various programs and data required for operation of the apparatus 900. The CPU 1001, the ROM 1002 and the RAM 1003 are connected with each other via a bus 1004. An input/output (I/O) interface 1005 is also connected to bus 1004.

The following components are connected to the I/O interface 1005: an input part 1006 comprising a keyboard, a mouse and so on; an output part 1007 comprising a cathode ray tube (CRT), a liquid crystal display (LCD) and a loudspeaker and so on; a storage part 1008 comprising a hard disk; and a communication part 1009 comprising a network interface card, such as LAN card and modem. The communication part 1009 performs a communication processing via a network, such as Internet. A driver 1010 is also connected to the I/O interface 1005 as required. A detachable medium 1011(such as a magnetic disk, a compact disk, a magneto-optical disk and a semiconductor memory and so on) is mounted on the driver 1010 as required so that the computer program read therefrom is mounted on the storage part 1008 as required.

To sum up, according to embodiments of the present disclosure, it provides a method and apparatus for determining causing cause of performance degradation of a storage system. Compared with the prior art, embodiments of the present disclosure can manage the system performance degradation effectively and continuously to minimize running costs and enable current performance profiling tools in the manner of insertion.

Generally, exemplary embodiments of the present disclosure can be implemented in hardware or dedicated circuits, software, logic or any combination thereof. Some aspects may be implemented in hardware while the other aspects may be implemented in firmware or software implemented by a controller, a microprocessor or other computing devices. When aspects of embodiments of the present disclosure are illustrated with figures or described with a block diagram, a flow chart or represented with other figures, it should be appreciated that the blocks, apparatuses, systems, techniques or methods described herein may be implemented in hardware, software, firmware, dedicated circuits or logic, universal hardware or a controller or other computing devices or some combinations thereof as non-limiting examples.

Meanwhile, blocks in the flow charts can be considered as method steps, and/or operations generated by operations of computer program codes, and/or considered as a plurality of coupled logic circuit units implementing the functions. For example, embodiments of the present disclosure include computer program products which include computer programs tangibly implemented on machine-readable mediums and include program codes configured to implement the methods described above.

In the context of the disclosure, machine-readable medium may be any tangible medium comprising or storing programs for instructing implementation system, apparatus or device. The machine readable medium may be machine readable signal medium or machine readable storage medium. The machine readable medium may include but is not limited to, electronic, magnetic, optical, electromagnetic, infrared or semiconductor systems, apparatuses or devices, or any proper combination thereof. More detailed example of the machine readable storage medium includes electrical connection with at least one lead, a portable computer disk, a hard disk, a random access memory (RAM), a read only memory (ROM), a erasable programmable read only memory (EPROM or flash disk), an optical storage device, a magnetic storage device, or any proper combinations thereof.

The computer program codes for implementing the method of the present disclosure may be programmed with at least one programming language. The computer program codes may be provided to the processor of a universal computer, a dedicated computer or other programmable data processing apparatuses so that the computer codes, when implemented by computer or other programmable data processing apparatuses, causes the function/operation specified by flow charts and/or block diagrams to be implemented. The program codes can be implemented wholly on the computer, partially on the computer, as an independent software package, partially on the computer and partially on the remote computer or wholly on a remote computer or server.

Though the operations are described in a particular order, it should not be interpreted that such operations are required to be completed in the particular order or in the successive order as shown, or all the operations shown in the figures should be implemented to achieve the expected result. In some conditions, multitask or parallel processing will be beneficial. Similarly, though some specific implementing details are included in the above discussion, it should not be interpreted as limiting the scope of the invention or claims but as the description of particular embodiments regarding a particular invention. Some features described separately in the context of embodiments in the specification may also be integrated in a single embodiment, and vice versa, features described in the context of a single embodiment may also be implemented in several embodiments or any sub-combination separately.

Various amendments and variations for the exemplary embodiments of the present disclosure will be apparent for those skilled in the art when reading the above description with reference to the drawings. Any or all the amendments are still within the un-limiting scope of exemplary embodiments of the present disclosure. Moreover, the aforementioned specification and drawings have illuminating benefits. Those skilled in the art in relation to embodiments of the present disclosure would envisage other embodiments of the present disclosure illustrated herein.

It should be appreciated that embodiments of the present disclosure are not limited to the specific embodiments of the present disclosure and modifications and other embodiments shall all be encompassed in the scope of the appended claims. Though specific terms are employed herein, they should be employed in universal and descriptive sense, rather than for limiting purpose.

We claim:

1. A method for determining a cause of performance degradation of a storage system, comprising: monitoring performance of the storage system according to a predetermined policy, wherein the storage system includes a plurality of targets and a plurality of layers; generating, based on a system performance baseline, a performance degradation event from a result of the monitoring; in response to the performance degradation event, obtaining information about the performance degradation, wherein obtaining information about the performance degradation in response to the performance degradation event comprises: performing, by a performance profiling tool, a first action based on a degree of the performance degradation, wherein the first action comprises at least one of the following: analyzing, on a first target of the plurality of targets, the plurality of layers in vertical, and analyzing, on a first layer of the plurality of layers, the plurality of targets in horizontal; and analyzing the information offline to determine the cause of the performance degradation.

2. The method of claim 1, wherein monitoring performance of the storage system according to a predetermined policy comprises:
   tracking a performance metric of a monitoring target to obtain original performance data of the monitoring target; and
   wherein generating a performance degradation event from a result of the monitoring based on a system performance baseline comprises:
      comparing the original performance data with a latest system performance baseline; and
      generating the performance degradation event based on a result of the comparing.

3. The method of claim 1, wherein generating the performance degradation event based on a result of the comparing comprises: generating the performance degradation event in response to determining that the original performance data is lower than the latest system performance baseline.

4. The method of claim 1, further comprising:
recording the performance degradation event as a four-element tuple, wherein the four-element tuple includes:
a latest performance statistic,
an indicator of the performance degradation,
a degree of the performance degradation, and
a count for reaching the degree of the performance degradation.

5. The method of claim 1, further comprising:
detecting normal performance of the storage system to generate a detected system performance baseline; and
generating the latest system performance baseline based on the detected system performance baseline.

6. The method of claim 5, wherein detecting normal performance of the storage system comprises:
detecting the normal performance of the storage system periodically; or
detecting the normal performance of the storage system in response to a configuration change of the storage system, wherein the configuration change comprises at least one of the following: hardware change, work load change, booting up of the storage system and mounting of a file system.

7. The method of claim 5, wherein generating the latest system performance baseline based on the detected system performance baseline comprises: generating the latest system performance baseline by weighting a current system performance baseline and the detected system performance baseline.

8. The method of claim 1, wherein obtaining information about the performance degradation in response to the performance degradation event further comprises:
monitoring resource utilization of the storage system;
performing a second action based on the resource utilization; and
performing the first action to obtain the information about the performance degradation, wherein the second action comprises:
ranking, based on the resource utilization, a plurality of targets that utilize a specific resource; and
limiting the utilization of the specific resource by at least one of the plurality of targets with a rank higher than a predetermined threshold.

9. The method of claim 1, wherein the first action is performed by at least one of the following entities: a system built-in performance profiling tool, a plug-in performance profiling tool, and a third-party performance profiling tool.

10. The method of claim 1, wherein information related to the performance degradation comprises at least one of the following: related event information, system tracking information, latest performance statistics information, and relevant system configuration information.

11. An apparatus for determining a cause of performance degradation of a storage system, including one or more processors and one or more memories configured to perform operations, comprising: monitoring performance of the storage system according to a predetermined policy, wherein the storage system includes a plurality of targets and a plurality of layers: generating, based on a system performance baseline, a performance degradation event from a result of the monitoring; obtaining information about the performance degradation in response to the performance degradation event, wherein obtaining information about the performance degradation in response to the performance degradation event comprises: performing, by a performance profiling tool, a first action based on a degree of performance degradation, wherein the first action comprises at least one of the following: analyzing, on a first target of the plurality of targets, the plurality of layers in vertical, and analyzing, on a first layer of the plurality of layers, the plurality of targets in horizontal; and analyzing the information offline to determine the cause of the performance degradation.

12. The apparatus of claim 11, wherein monitoring performance of the storage system according to a predetermined policy comprises:
tracking a performance metric of a monitoring target to obtain original performance data of the monitoring target; and
wherein generating the performance degradation event from the result of the monitoring based on the system performance baseline comprises:
comparing the original performance data with a latest system performance baseline, and
generating the performance degradation event based on a result of the comparing.

13. The apparatus of claim 11, wherein generating the performance degradation event based on a result of the comparing includes: generating the performance degradation event in response to determining that the original performance data is lower than the latest system performance baseline.

14. The apparatus of claim 11, further comprising:
recording the performance degradation event as a four-element tuple, wherein the four-element tuple includes:
a latest performance statistic,
an indicator of the performance degradation,
a degree of the performance degradation, and
a count for reaching the degree of the performance degradation.

15. The apparatus of claim 11, wherein the operations further comprise:
detecting normal performance of the storage system to generate a detected system performance baseline; and
generating the latest system performance baseline based on the detected system performance baseline.

16. The apparatus of claim 15, wherein the operations further comprise:
detecting the normal performance of the storage system periodically; or
detecting the normal performance of the storage system in response to a configuration change of the storage system, wherein the configuration change comprises at least one of the following: hardware change, work load change, booting up of the storage system and mounting of a file system.

17. The apparatus of claim 15, wherein the operations further comprise generating the latest system performance baseline by weighting a current system performance baseline and the detected system performance baseline.

18. The apparatus of claim 11, wherein the operations further comprise:
monitoring resource utilization of the storage system;
performing a second action based on the resource utilization; and
performing the first action to obtain the information about the performance degradation, wherein the second action comprises at least one of the following:
ranking, based on the resource utilization, a plurality of targets that utilize a specific resources; and limiting the utilization of the specific resources by at least one of the plurality of targets with a rank higher than a predetermined threshold.

* * * * *